Figure 1:
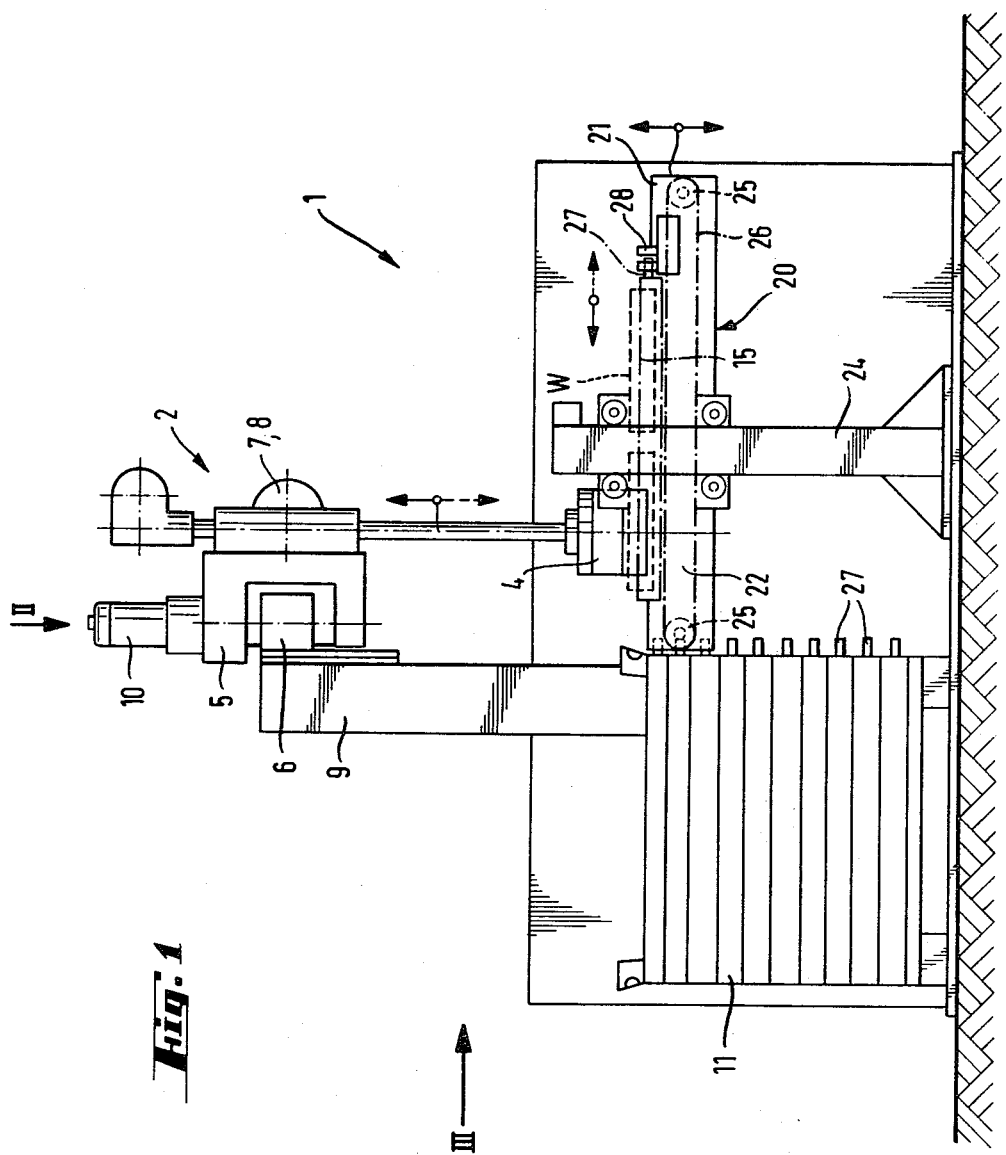

United States Patent [19]

Kripzak

[11] 4,362,454
[45] Dec. 7, 1982

[54] HANDLING SYSTEM FOR WORKPIECES

[75] Inventor: Rudolf Kripzak, Heilbronn, Fed. Rep. of Germany

[73] Assignee: Rudolf Kripzak, Fed. Rep. of Germany

[21] Appl. No.: 263,367

[22] Filed: May 14, 1981

[30] Foreign Application Priority Data

May 19, 1980 [DE] Fed. Rep. of Germany ....... 3019017

[51] Int. Cl.³ .......................... B65G 1/06; B65G 1/10
[52] U.S. Cl. ................................... 414/280; 414/267; 414/416; 414/331; 414/745
[58] Field of Search ............... 414/266, 267, 268, 278, 414/280, 286, 312, 331, 416, 417, 745, 787

[56] References Cited

U.S. PATENT DOCUMENTS 2,954,882  10/1960  Dailey .............................. 414/280
4,203,696   5/1980  Lindberg ........................... 414/280

Primary Examiner—Robert B. Reeves
Assistant Examiner—James Barlow
Attorney, Agent, or Firm—Kane, Dalsimer, Kane, Sullivan and Kurucz

[57] ABSTRACT

A system for automatically transporting workpieces between a magazine and a machine tool, includes a pair of grabs each movable vertically and also horizontally on a trolley, and arranged to shift workpieces in succession to and from one of a series of drawers in the magazine. The drawers are mounted on guide rails, and are removed in succession by a handling device including a conveyor, raised to the height of a loading station at the top of the magazine, where the grabs operate, shifted horizontally to combine with the movement of the grabs, and then returned to the magazine.

4 Claims, 4 Drawing Figures

HANDLING SYSTEM FOR WORKPIECES

This invention relates to a system for handling workpieces in conjunction with a machine tool, in which system unmachined workpieces are removed from a workpiece storage device by means of a vertically and horizontally movable grab and fed to the machine tool, and after machining the machined workpieces are returned to the storage device.

The type of storage used hitherto for workpieces which are to be or have been machined is not satisfactory, especially if manufacture is intended to be fully automated, and one of the objects of the invention is to produce an improved and economical handling system for charging workpieces automatically to a machine tool.

The invention consists in a handling system for workpieces, to be used in conjunction with a machine tool, including a workpiece storage device from which unmachined workpieces are removed by means of a vertically and horizontally movable grab, fed to the machine tool, and after machining returned to the storage device, including several drawers located by guides at different levels, and having locations for the workpieces, and including also a handling device arranged to withdraw the drawers from the storage device, to raise the drawers into a loading and unloading station, to move the drawer at the loading and unloading station at right angles to the horizontal direction of movement of the grab, and also to lower the drawer and push the said drawer back into the storage device.

In a preferred construction according to the invention the handling system operates in such a way that the drawers of the storage device are first loaded at a suitable store with the workpieces to be machined and are pushed into the storage device, the storage device is then brought to a point beside the machine tool, and the individual drawers are removed from the storage device in succession at this location and are lifted into a loading and unloading station at which the workpieces are removed, fed to the machine tool, and after machining, returned again to the drawer. When all the workpieces of one drawer have been machined, the drawer is returned to its original position in the storage device, whereupon the next drawer is pulled out and shifted into the loading and unloading station. Because the loading and unloading station for all the drawers lies in the same plane, a very simple system is used for controlling the vertical movement of the grab. When the workpieces of all the drawers of one storage device have been machined, the storage device is removed and replaced by a new storage device with drawers containing unmachined workpieces, and these operations can be controlled fully automatically.

The loading and unloading station is preferably located on the storage device, for example, by providing above the guides for the individual drawers a similarly shaped guide to locate the selected drawer at the upper level of the storage device which is to be unloaded or loaded. As a result of the loading and unloading station being arranged on or above the storage device, only slight additional space is necessary.

The handling device for removing, lifting, lowering and returning the drawers to position may include a height-adjustable table with a horizontal conveyor mechanism, which table is located at the side of the storage device and is provided with means for catching or gripping the individual drawers.

It is preferable to locate the loading and unloading station essentially in the feed plane of the machine tool, so that the grab only has to perform relatively small vertical movements, whereby the drive mechanism of the grab is simplified.

Figure 2:
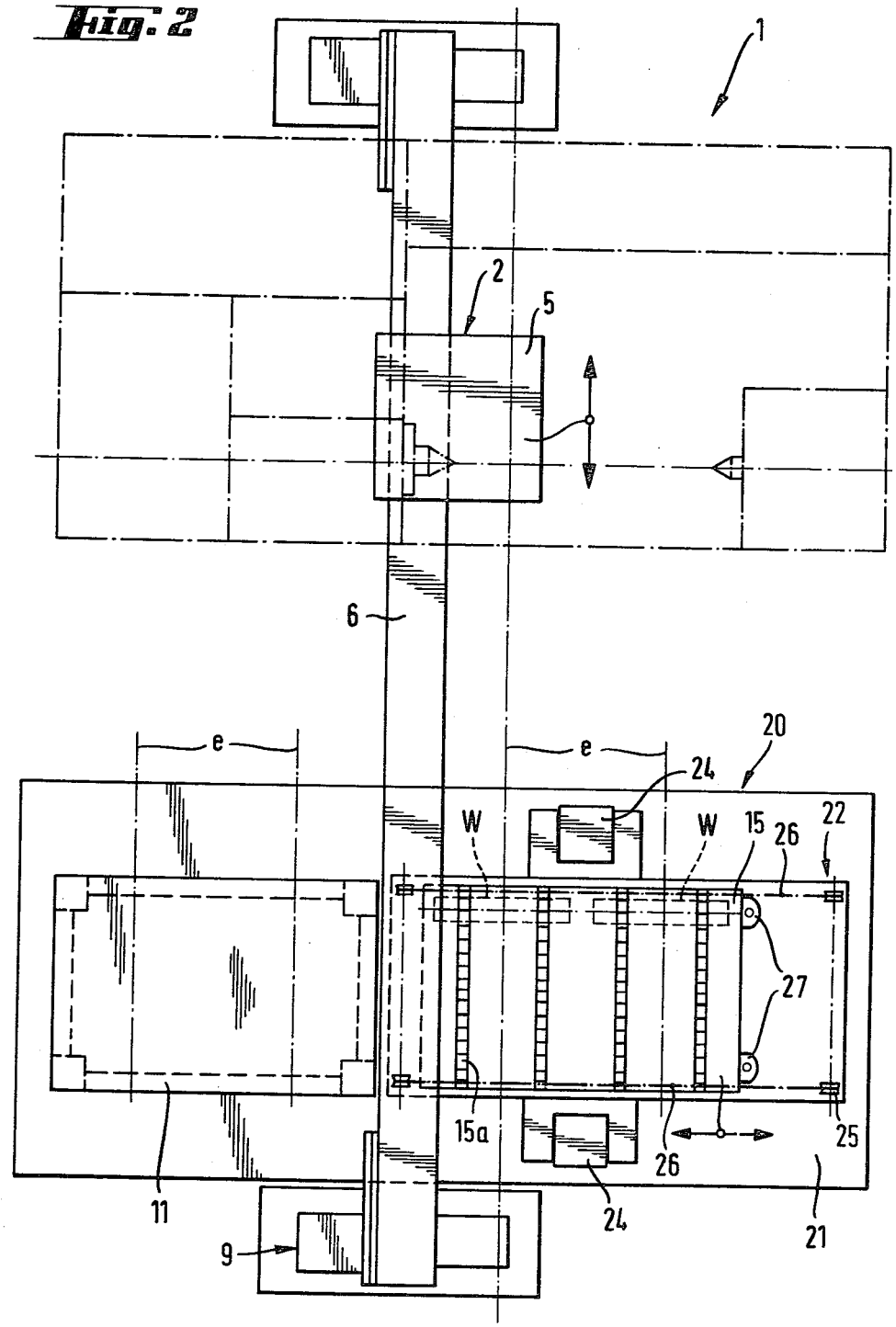
Figure 3:
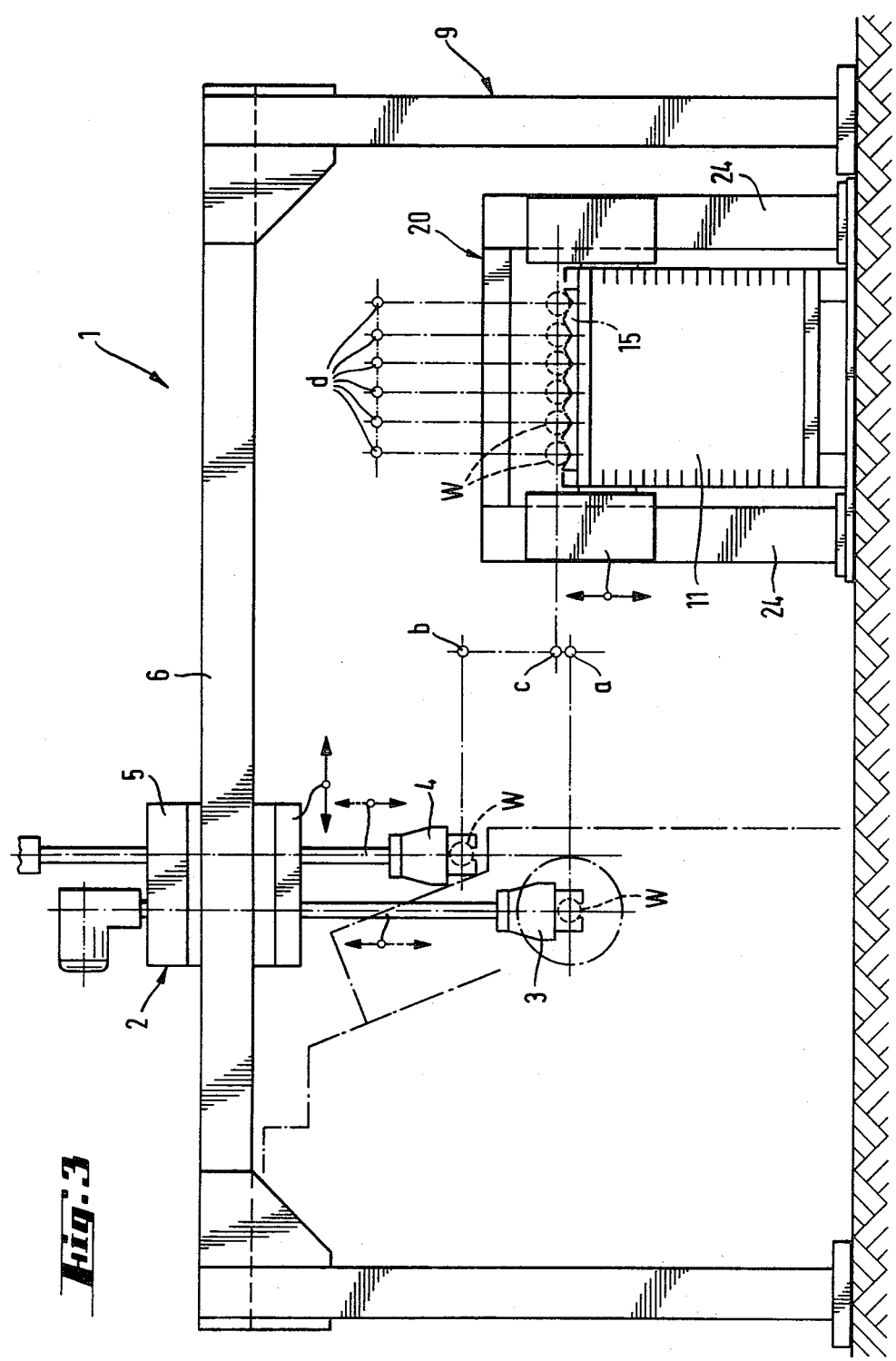
Figure 4:
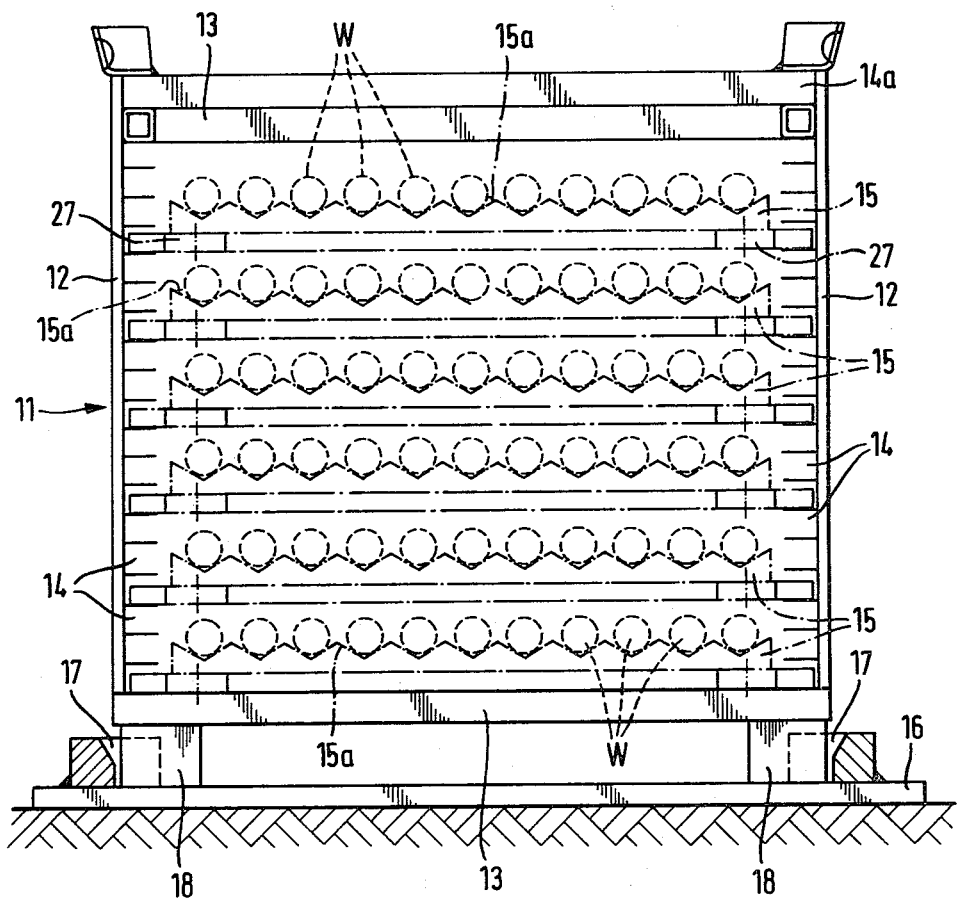

The invention may be performed in various ways and one specific embodiment will now be described by way of example with reference to the accompanying drawings, in which:

FIG. 1 is a diagrammatic side view of a handling system according to the invention, FIG. 2 is a diagrammatic top plan view of the handling system of FIG. 1, FIG. 3 is a diagrammatic end view of the handling system in FIG. 1, seen from the left, and FIG. 4 is a diagrammatic side view of a storage device for use with the invention, on a larger scale.

FIGS. 1 and 2 illustrate diagrammatically a copy-turning machine 1 to which workpieces to be machined are fed in succession by a grab mechanism 2. The grab mechanism in this illustrated embodiment comprises two alternately operating grabs 3 and 4, which can be moved horizontally by means of a sliding trolley 5 on a sliding rail 6, and vertically by electric motors 7 or 8. The sliding rail 6 is part of an overhead loading bridge or gantry 9, and the sliding trolley 5 is moved by means of an electric motor 10.

At the side of the machine tool 1 there is located a storage device, which is indicated generally at 11 and is illustrated on an enlarged scale in FIG. 4. The storage device has a cuboid or rectangular shaped frame, which comprises vertical posts 12 and horizontal supports 13. The frame contains a plurality of guide rails 14, which lie above each other in horizontal planes and locate drawers 15 which have mounts or receptacles 15a for the workpieces W which are to be machined or have been machined, (in the illustrated example these are cylindrical shafts). The frame is supported by a foundation 16 with stands 17 for the feet 18 of the frame, which can thus be transported into position for example by means of a fork lift truck and set down on the foundation 16.

The handling system also includes a drawer handling device which is indicated generally at 20, and which comprises a height-adjustable table 21 with a horizontal conveyor mechanism 22, the table being located at the side of the storage device 11. The table is mounted on vertical columns 24 and its height can be adjusted, for example, by hydraulic means. The conveyor mechanism 22 may be in the form of a chain conveyor, with endless chains 26 moving round rollers 25. The individual drawers 15 have handles 27 provided at their front ends, which can be engaged by catches 28 fixed to the conveyor chains 26, and the device 20 is arranged to pull out the drawers 15 from the frame in succession, beginning with the uppermost one, and lift them into a loading and unloading station, which in this illustrated example lies in the plane of the uppermost guide rail 14a of the frame. By horizontal movement of the individual drawers in this plane normal to the horizontal direction of movement of the grabs 3 and 4, each individual workpiece on or in a drawer can be gripped by a combination of horizontal and vertical movements of the grabs. The horizontal movement of the individual drawers is effected by means of a phasing system (not illustrated) which controls the movement of the conveyor mechanism 22.

Because the drawer which is to be located or unloaded can be pushed out of and through the storage device 11 into the loading and unloading station, the space requirement is reduced to a minimum. The loading and unloading always takes place in the same plane, so that only a single vertical starting position for gripping and releasing the workpieces has to be provided for the grabs 3 and 4. In FIG. 3 the vertical starting position of the grabs 3 and 4 for feeding the workpieces to the machine tool is indicated at a, and this starting position a therefore lies in the machining plane of the machine tool. The vertical starting position for the grabs for feeding and removing the workpieces is indicated at b, whilst c represents the vertical starting position of the grabs 3 and 4 for gripping or depositing the workpieces onto or into the drawers 15. The horizontal starting positions of the grabs 3 and 4 are indicated at d, the horizontal starting positions of the conveyor mechanism 22 are indicated at e in FIG. 2, whilst the vertical starting positions of the conveyor mechanism 22 result from the position of the individual drawers 15 in the storage device 11.

The handling system as illustrated operates in such a way that the storage device 11 (i.e. its drawers 15) is first filled at a suitable store with the workpieces which have to be machined. The storage device is then brought to the relevant machine tool by means of a fork lift truck. This procedure can also be automated by providing an automatic conveying device for the storage device. The handling device 20 then takes drawers 15 one after the other from the storage device 11, beginning from the top, and lifts them into the loading and unloading station, where the grabs 3 and 4 accept the workpieces singly, convey them to the machine tool 1, remove them after machining by the machine tool 1, return them to the drawer 15 and deposit them there. When all the workpieces of one drawer have been machined, the latter is lowered and pushed back into the storage device 11 again, whereupon the next drawer is removed and is lifted into the loading and unloading station, whereupon the procedure described is repeated. When the workpieces of all the drawers of one storage device have been machined, the storage device is removed and replaced by a new storage device with unmachined workpieces.

Several modifications of the illustrated system are possible without any departure from the framework of the invention. The loading and unloading plane can, for example, lie above the storage device 11, and an individual stationary supporting device can be provided for the drawers which are to be unloaded or loaded, this extending across the storage device.

I claim:

1. A handling system for workpieces, to be used in conjunction with a machine tool, including a workpiece storage device comprising a plurality of drawers having locations for the workpieces, guides for locating said drawers at different levels, means for removing, transporting, and returning workpieces to and from said storage device including a vertically and horizontally movable grab, a handling device arranged to withdraw the drawers from said storage device, to raise the drawers into a loading and unloading station, to move the drawer at the loading and unloading station at right angles to the horizontal direction of movement of said grab, and also to lower the drawer and push the said drawer back into the storage device.

2. A handling system according to claim 1, in which the loading and unloading station is located on said storage device.

3. A handling system according to claim 1 in which said drawer handling device includes a height-adjustable table, and a horizontal conveyor mechanism provided with means for gripping the individual drawers.

4. A handling system according to claim 1, in which the loading and unloading station is situated essentially in the feed plane of the machine tool.

* * * * *

UNITED STATES PATENT AND TRADEMARK OFFICE
CERTIFICATE OF CORRECTION

PATENT NO. : 4,362,454
DATED : December 7, 1982
INVENTOR(S) : Rudolf Kripzak

It is certified that error appears in the above—identified patent and that said Letters Patent is hereby corrected as shown below:

On the title page, [73]
Assignee: should read  --KK AUTOMATION KLAUS TH. KRAMER
G.m.b.H. & Co. K.G. of Fed. Rep. of Germany
Column 3, line 3, "located" should read -- loaded --.

Signed and Sealed this

Nineteenth Day of April 1983

[SEAL]

Attest:

GERALD J. MOSSINGHOFF

*Attesting Officer*     *Commissioner of Patents and Trademarks*